R. A. BROOKS.
TIRE RETREADING APPARATUS.
APPLICATION FILED OCT. 14, 1918.
1,327,307.
Patented Jan. 6, 1920.
2 SHEETS—SHEET 1.
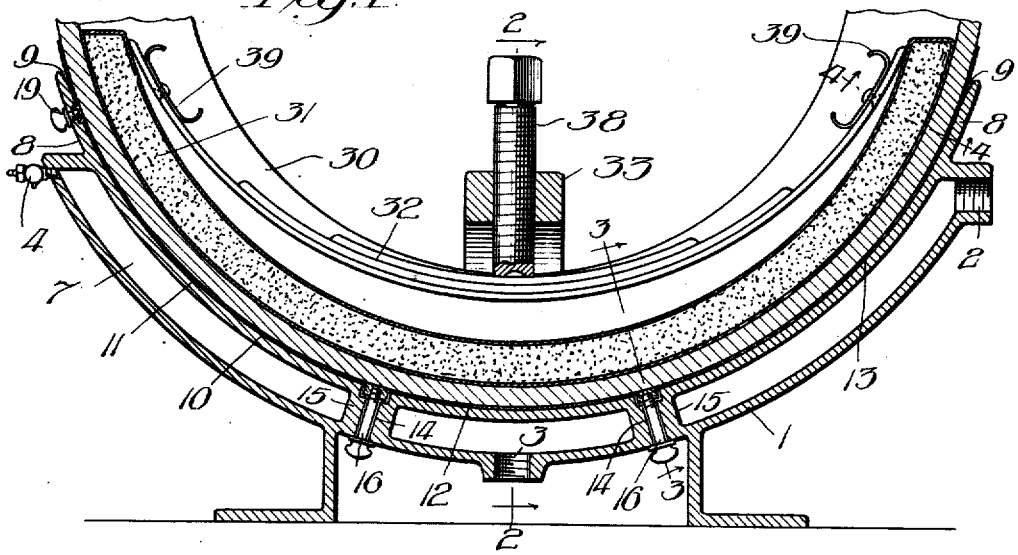
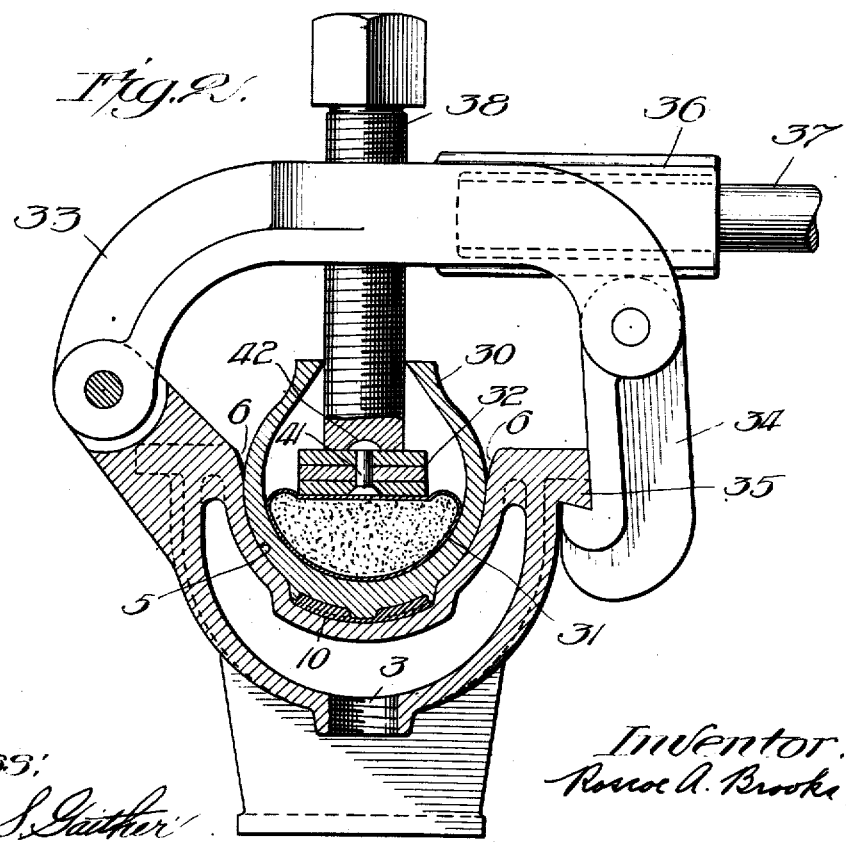
Witness:
Harry S. Gaither
Inventor:
Roscoe A. Brooks,
by Chamberlin Freudenreich
Attys R. A. BROOKS.
TIRE RETREADING APPARATUS.
APPLICATION FILED OCT. 14, 1918.
1,327,307.
Patented Jan. 6, 1920.
2 SHEETS—SHEET 2.
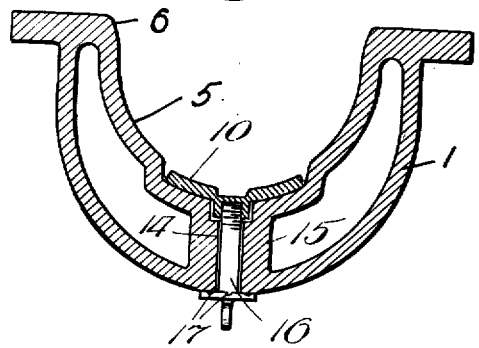
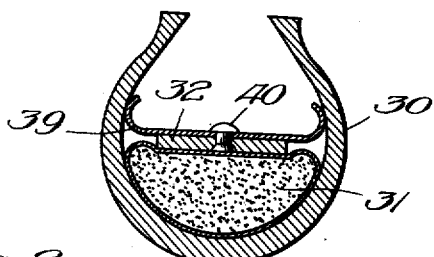
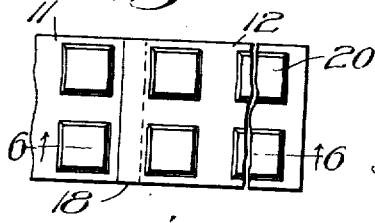
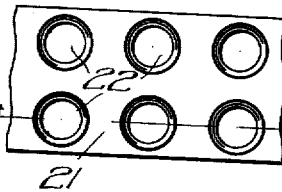
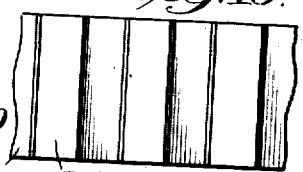
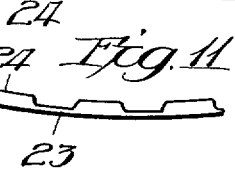
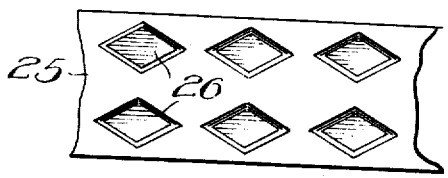
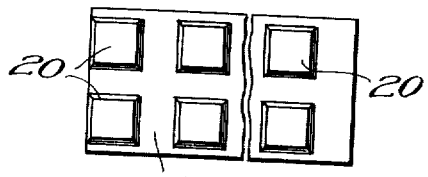
Witness:
Harry S. Gaither
Inventor:
Roscoe A. Brooks
by Chamberlin Freudenreich
Attys

UNITED STATES PATENT OFFICE.

ROSCOE A. BROOKS. OF CHICAGO, ILLINOIS, ASSIGNOR TO WESTERN TIRE & RUBBER WORKS, OF CHICAGO, ILLINOIS, A COPARTNERSHIP COMPRISING ROSCOE A. BROOKS, OF CHICAGO, ILLINOIS, AND GEORGE W. CLARK, OF OAK PARK, ILLINOIS.

TIRE-RETREADING APPARATUS.

1,327,307.    Specification of Letters Patent.    Patented Jan. 6, 1920.

Application filed October 14, 1918. Serial No. 257,956. MAY 4 1920

*To all whom it may concern:*

Be it known that I, ROSCOE A. BROOKS, a citizen of the United States, residing at Chicago, county of Cook, State of Illinois, have invented a certain new and useful Improvement in Tire-Retreading Apparatus, and declare the following to be a full, clear, and exact description of the same, such as will enable others skilled in the art to which it pertains to make and use the same, reference being had to the accompanying drawings, which form a part of this specification.

My invention has for its object to produce a simple apparatus for retreading tires, such as automobile tires, which shall not only operate most efficiently but be easily manipulated so as accurately to adjust a tire to the same quickly and with a minimum expenditure of effort.

A further object of the present invention is to produce a simple and novel tire retreading apparatus by means of which a uniform distribution of pressure may be obtained throughout any desired circumferential length without employing a multiplicity of clamping or pressure devices. By avoiding the use of a multiplicity of separately adjustable clamps or the like the great difficulty heretofore experienced in securing a uniform distribution of pressure may be overcome and therefore, viewed in one of its aspects, my invention may be said to have for its object to produce an apparatus in which a uniform distribution of pressure at the surface which is being retreaded will be insured.

Another object of the present invention is to produce a tire retreading apparatus by means of which anti-skid designs of various kinds may be produced in one and the same apparatus.

A further object of the present invention is to produce a simple and novel tire retreading apparatus which will permit anti-skid designs to be worked into tires of various sizes in the same apparatus without destroying the character of the design at any point on account of the necessity of making an overlap.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a vertical longitudinal section of the apparatus and a tire located therein, arranged in accordance with the present invention and adapted to retread a tire in three sections;

Fig. 2 is a section on an enlarged scale taken approximately on line 2—2 of Fig. 1, showing the clamp or pressure-producing device in its closed position;

Fig. 3 is a section taken approximately on line 3—3 of Fig. 1, on the same scale as Fig. 2, showing only the mold;

Fig. 4 is a section on line 4—4 of Fig. 1, showing only the tire and the pressure producing means, the mold being omitted;

Fig. 5 is a plan view of the two stationary matrix members shown in the mold in Fig. 1, parts being broken away;

Fig. 6 is a section on line 6—6 of Fig. 5;

Fig. 7 is a top plan view of the movable matrix member arranged in the mold in Fig. 1;

Fig. 8 is a plan view of a section of a matrix adapted to form on the tread a different design from that produced by the use of the matrix shown in Fig. 5;

Fig. 9 is a section taken on line 9—9 of Fig. 8;

Fig. 10 is a plan view of a fragment of a matrix showing a still different design;

Fig. 11 is an edge view of the matrix shown in Fig. 10; and

Fig. 12 is a plan view of a section of a matrix adapted to form a still further type of design on the tread surface.

Reference being had to the drawings, 1 represents a hollow mold in the form of a trough-shaped segment. The circumferential length of the mold depends upon the number of sections in which the retreading of a tire is to take place. The apparatus shown is designed to retread a tire in three sections and its circumferential length is therefore made slightly more than 120 degrees. A circulation of a heating medium, such as steam, may be obtained through the mold, an inlet opening, 2, and an outlet opening, 3, being provided for this purpose. Where the inlet opening is at one end of the mold, a vent hole, 4, for the escape of air, is preferably placed at the opposite end, so as to permit the outlet to be placed at the bottom without permitting air to be trapped in the mold. The trough, 5, of the mold is given the shape of the tire to be retreaded except that at the edges it flares outwardly as indicated at 6 so that there will be no sharp corner or edge left to make a mark in the tire. The ends of the mold are preferably carried somewhat beyond the steam chamber 7, as indicated at 8, and are gradually rounded off so that at its extreme ends the trough of the mold becomes flaring and therefore prevents the sides of the tire from being marred at the ends of the mold.

The character of the tread surface is determined by a sectional matrix, 10, fitted into the bottom of the trough. By making the matrix separable from the mold it can readily be removed and replaced for the purpose of varying the design. Where the design contains transverse lines or shoulders, as distinguished from mere continuous ribs or depressions extending circumferentially around the tire, it is necessary that means be provided to insure that there will not be an overlapping at the meeting ends of the first and the final retreaded sections. In the case of any given tire a mold could of course be constructed which would permit the retreading to be done in sections which would exactly meet so that there would be no overlapping; but, there is a considerable variation in the circumferential length of tires of different makes which purport to be of the same size and, furthermore, it is quite feasible, leaving out of consideration the design of the tread surface, to employ the same apparatus for retreading tires purporting to be of different sizes. Consequently it is necessary, in order not to restrict the use of any individual apparatus, that some means should be provided to permit the mold to accommodate itself not only to different sizes of tires but to such tires having designs containing transverse lines or shoulders. To this end I make the matrix in sections, at least one section being fixed in the mold and at least one other section being adjustable so that it may be moved in the circumferential direction and permit the last section of the tire to be retreaded without causing an overlapping of the design between the adjacent ends of that section and the section that was the first to be retreaded. For the sake of convenience in manufacture the stationary part of the matrix is preferably made in two sections, 11 and 12; these members being placed in one end of the mold while the movable section, 13, is simply laid loosely in the other end of the mold. The parts are preferably so constructed that air can pass around the matrix underneath a tire placed in the mold and escape through suitable vent openings. This may conveniently be accomplished by casting the matrices and leaving their under sides unfinished so that they will not have a machined fit in the mold and yet will fit with a sufficient degree of tightness to hold them in place. The vent holes may conveniently be openings or passages, 14, extending through bosses or spacing devices, 15, contained within the hollow wall or steam chamber of the mold; these openings 14 serving also to permit the insertion of bolts or thumb screws, 16, which pass up from underneath the mold into the section 12 of the matrix. The bolts or thumb screws are made smaller in diameter than the holes through which they pass and, in order to insure that there will be a free passage for the escape of air, the under side of the head of each of the bolts or thumb nuts may be grooved as indicated at 17 in Fig. 3. The section 11 of the matrix may be held in place at its inner end by interlocking it with the adjacent end of the member 12 as indicated at 18 in Figs. 5 and 6; while a thumb screw, 19, passes through the flange or wall, 8, of the mold into the outer end of the member 11 of the matrix. Thus both of the stationary members of the matrix are held firmly in place while in use and yet may be quickly removed and replaced by others. The member 13 is simply laid in place and, when the last section of the tread is to be worked upon, the member 13 is removed from the mold and laid on the tire with one end in registration with the design on the retreaded part; the matrix member being placed on the tire in such position that when the tire is located in the mold, the meeting ends of the members 12 and 13 will not be spaced apart a distance greater than one element of the design. Furthermore, the design is preferably so disposed on the member 13 that by turning the member 13 end for end compensation may be made which will give the operator the choice of either of two locations. Thus, assuming that the tread surface is to have two rows of square depressions and that the matrix will be made as shown in Figs. 5 and 6, that is, be provided with two rows of square projections, 20, the projections at one end of the plate or matrix member may be placed close to the edge while at the other end they may be placed at some distance from the edge, as shown in Fig. 7. Either the right hand end or the left hand end of the member shown in Fig. 7 may be placed against the right hand end of the member 12 in Fig. 5 or in the vicinity of the latter end.

In Figs. 8 and 9 there is illustrated a matrix, 21, having circular holes or sockets, 22, for the purpose of producing a tread surface having round knobs.

In Figs. 10 and 11 the matrix, 23, has transverse broad, shallow ribs, 24, for the purpose of producing a tread surface having cross bars.

The matrix shown in Fig. 12 has diamond-shaped depressions, 26. In the same way any other suitable or desired design may be formed on the matrix.

One of the difficult problems is that of securing an even pressure between the tire and the mold, at all points along the mold. To this end it is customary to employ a sand bag in the form of a segment of an inner tire which is laid into the tire when the latter is placed in the mold. In Figs. 1, 2 and 4 30 represents the tire upon which the work is being done and 31 represents the sand bag. Heretofore a plurality of clamps, as many as five or six, have been employed at different points along the sand bag for clamping the tire between the latter and the mold; this being a tedious process and one which does not insure uniform results. In accordance with the present invention there is employed only a single clamping member which may conveniently take the form of a leaf spring, 32, made up of any desired number of superimposed leaves of various lengths; the length of the longest leaf being as great as that of the mold. The spring is preferably given an initial curvature which is less than that of the mold or the tire to be worked upon, that is, the spring is curved on a longer radius than the radius of the tire. After the tire has been placed in the mold and the sand bag has been located therein, the spring is laid upon the sand bag and pressure is applied to the center of the spring so as gradually to bend the spring until it engages at all points through its length, with the sand bag and, through the latter, exerts a distributed pressure on the tire. As the ends of the spring are free it is possible, by properly proportioning the same, to secure a uniform equalized distribution of pressure throughout the whole section of the tire which is being vulcanized. It is essential that no air pockets shall form between the tire and the mold but, as the tire is progressively forced into intimate contact with the mold from the outer ends of the latter toward the middle, the air is forced inwardly and downwardly and escapes around the matrix through the vent holes, 14, provided for that purpose. Consequently there can be no pocketing of air.

Any suitable means may be provided for pressing the spring member. In the arrangement shown an arm, 33, is hinged at one end to one side of the mold at about the middle thereof, the arm being adapted to swing through a tire in the mold to the opposite side of the mold; a dog or catch, 34, being provided on the free end of the arm for engagement with a flange or shoulder, 35, on the mold. The arm may be provided with a socket, 36, into which a suitable operating handle, 37, may be placed. A heavy set screw, 38, is carried by the arm in position to overlie and engage with the middle of the spring 32. The device may be used in two ways. After the set screw has once been adjusted for a given tire, its adjustment need not be changed as the tire is moved from one position to another but all of the work may be performed by simply manipulating the handle or lever, 37. On the other hand, if desired, all of the operations except the mere locking and unlocking of the clamp, may be performed by screwing or unscrewing the heavy set screw.

The width of the spring will usually be considerably less than the diameter of the tire and therefore it may sometimes be found desirable to provide means for preventing the spring from slipping sidewise. To this end movable clips or fingers, 39, may be placed at the ends of the spring, they being so proportioned that when they occupy the position shown in Fig. 1 they lie within the planes of the side edges of the spring whereas, when they are turned on their pivots, 40, through an angle of 90 degrees to the position illustrated in Fig. 4, they engage with the sides of the tire and center the spring. The several plates of the spring may be held together by a rivet, 41, placed at the center and the lower or inner end of the set screw, 38, may be recessed as indicated at 42 so as to provide a seat for the head of the rivet and at the same time interlock the spring and the set screw so as to center the spring and prevent displacement in the lengthwise direction or transversely in the vicinity of the set screw.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In an apparatus of the character described, a mold, a longitudinal spring member, and means for pressing said spring member into the mold.

2. In an apparatus of the character described, a mold curved from end to end, a longitudinal spring member having a lesser curvature than the mold, and means for pressing said member into the mold until it conforms to the latter.

3. In an apparatus of the character described, a mold curved from end to end, a longitudinal spring member having a lesser curvature than the mold, and means engaging with said spring member midway between the ends thereof for pressing said member into the mold until it conforms to the curvature of the latter.

4. In an apparatus of the character described, a curved mold adapted to receive a section of a tire, a longitudinal spring clamping member less curved than the mold, and means for pressing said clamping member against the inner surface of a tire in the mold so as to increase the curvature of said member and apply pressure to the tire along the entire length of said member.

5. In an apparatus of the character dedescribed, an elongated mold curved in the direction of its length and adapted to receive a section of a tire, a longitudinal spring presser member having on the side toward the mold a face less sharply curved than the mold, and a power device engaging with the said member at a point about midway between its ends to press the same into a tire lying in the mold and increase the curvature of said member so as to exert on the tire a pressure distributed throughout the length of said member.

6. In an apparatus of the character described, a trough-shaped mold curved in the direction of its length along the arc of a circle, the mold having vent openings at the middle to permit the escape of air from underneath the tire lying in the mold, and means for progressively pressing a tire in the mold against the mold from the ends toward the middle.

7. In an apparatus of the character described, a mold, and a matrix extending throughout the length of the mold, said matrix being in sections one of which is stationary and another, at one end of the mold, is movable in the direction of the length of the mold.

8. In an apparatus of the character described, a mold, and a matrix extending throughout the length of the mold, said matrix being in sections one of which is stationary and another, at one end of the mold, is loose in the mold.

9. In an apparatus of the character described, a mold, and a matrix extending throughout the length of the mold, said matrix being in sections one of which is stationary and another, at one end of the mold, is movable in the direction of the length of the mold, the matrix containing a design for an anti-skid tread, and the design on the movable section being disposed differently with respect to one end of the latter than with respect to the other so as to permit a variation to be produced by reversing the movable member of the matrix.

In testimony whereof, I sign this specification.

ROSCOE A. BROOKS.